(12) United States Patent
Chandrasekaran et al.

(10) Patent No.: US 12,210,540 B2
(45) Date of Patent: Jan. 28, 2025

(54) SYSTEMS AND METHODS OF DATABASE CONNECTION AND MANAGEMENT OF REQUESTS

(71) Applicant: salesforce.com, inc., San Francisco, CA (US)

(72) Inventors: Venkatesan Chandrasekaran, San Francisco, CA (US); Valliappan Annamalai Natarajan, San Francisco, CA (US); Sidarth Srinivas Conjeevaram, New Haven, CT (US); Vijayanth Devadhar, Fremont, CA (US); Zeyu Zheng, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 307 days.

(21) Appl. No.: 17/552,628

(22) Filed: Dec. 16, 2021

(65) Prior Publication Data

US 2023/0195738 A1 Jun. 22, 2023

(51) Int. Cl.
G06F 16/24 (2019.01)
G06F 11/34 (2006.01)
G06F 16/2458 (2019.01)
G06F 16/25 (2019.01)
G06F 16/27 (2019.01)

(52) U.S. Cl.
CPC ...... *G06F 16/2471* (2019.01); *G06F 11/3409* (2013.01); *G06F 16/256* (2019.01); *G06F 16/27* (2019.01)

(58) Field of Classification Search
None
See application file for complete search history.

(56) References Cited

U.S. PATENT DOCUMENTS

| | | | |
|---|---|---|---|
| 7,627,726 B2 | 12/2009 | Chandrasekaran |
| 7,987,210 B1 | 7/2011 | Wei |
| 7,987,470 B1 | 7/2011 | Wei |
| 8,150,887 B1 | 4/2012 | Wei |
| 8,171,006 B1 | 5/2012 | Wei |
| 8,171,054 B1 | 5/2012 | Wei |
| 8,244,778 B1 | 8/2012 | Wei |
| 8,255,426 B1 | 8/2012 | Wei |
| 8,275,808 B2 | 9/2012 | Wei |

(Continued)

OTHER PUBLICATIONS

Seonmyeong Bak; Multi-level Load Balancing with an Integrated Runtime Approach; IEEE; pp. 31-40 (Year: 2018).*

*Primary Examiner* — Albert M Phillips, III
*Assistant Examiner* — Jermaine A Mincey
(74) *Attorney, Agent, or Firm* — Butzel Long (57) ABSTRACT

Systems and methods are provided for receiving a request at a database system that includes a primary node and one or more standby nodes. When the request is determined to be a read-only request and the previous transaction has been replicated to the standby node, the request may be transmitted to one of the one or more standby nodes to perform the read-only operation to retrieve data of the request and transmitting the retrieved data. When the request is determined to be a read-only request and the previous transaction has not been replicated to the standby node, the read-only operation is performed to retrieve data of the request from the primary node and transmitting the retrieved data.

16 Claims, 8 Drawing Sheets

(56) References Cited

U.S. PATENT DOCUMENTS

| | | |
|---|---|---|
| 8,375,015 B2 | 2/2013 | Wei |
| 8,560,572 B2 | 10/2013 | Wei |
| 8,595,265 B2 | 11/2013 | Wei |
| 8,656,410 B1 | 2/2014 | Wei |
| 8,694,546 B2 | 4/2014 | Wei |
| 8,930,336 B2 | 1/2015 | Wei |
| 8,949,282 B1 | 2/2015 | Wei |
| 9,009,731 B2 | 4/2015 | Wei |
| 9,547,689 B2 | 1/2017 | Chandrasekaran |
| 9,760,623 B2 | 9/2017 | Wei |
| 10,078,618 B2 | 9/2018 | Chandrasekaran |
| 10,652,246 B2 | 5/2020 | Chandrasekaran |
| 10,693,709 B2 | 6/2020 | Chainani |
| 10,726,053 B2 | 7/2020 | Wei |
| 11,151,150 B2 | 10/2021 | Obembe |
| 11,165,857 B2 | 11/2021 | Obembe |
| 2005/0071391 A1* | 3/2005 | Fuerderer ............... G06F 16/00 |
| 2012/0239697 A1* | 9/2012 | Ram ....................... G06F 16/25 |
| | | 707/E17.005 |
| 2012/0290714 A1* | 11/2012 | Cohen ................. G06F 11/3055 |
| | | 709/224 |
| 2013/0060815 A1* | 3/2013 | Saeki ...................... G06F 16/27 |
| | | 707/802 |
| 2017/0147527 A1 | 5/2017 | Chandrasekaran |
| 2019/0306008 A1 | 10/2019 | Chainani |
| 2020/0137084 A1* | 4/2020 | Roy ................... H04L 63/0236 |
| 2020/0342008 A1 | 10/2020 | Wei |
| 2021/0089910 A1 | 3/2021 | Zheng |
| 2021/0126964 A1 | 4/2021 | Obembe |

\* cited by examiner

SYSTEMS AND METHODS OF DATABASE CONNECTION AND MANAGEMENT OF REQUESTS

BACKGROUND

Current website-based commerce applications typically communicate with a database system to operate to provide information and perform transactions with customers. As the number of customers visiting the website increase, the present systems are unable to scale to provide information, perform transactions, and provide personalized results to a customer. During high-demand times when many customers are attempting to access the website, there can be delays and system unavailability.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description explain the principles of implementations of the disclosed subject matter. No attempt is made to show structural details in more detail than can be necessary for a fundamental understanding of the disclosed subject matter and various ways in which it can be practiced.

FIGS. 2A-3 show optional operations of the example method shown in FIG. 1 according to an implementation of the disclosed subject matter.

DETAILED DESCRIPTION

Various aspects or features of this disclosure are described with reference to the drawings, wherein like reference numerals are used to refer to like elements throughout. In this specification, numerous details are set forth in order to provide a thorough understanding of this disclosure. It should be understood, however, that certain aspects of disclosure can be practiced without these specific details, or with other methods, components, materials, or the like. In other instances, well-known structures and devices are shown in block diagram form to facilitate describing the subject disclosure.

Implementations of the disclosed subject matter may provide scaling of a database system to handle the number of requests by adding read-only standby nodes. The standby nodes of the database system may handle read-only requests, and a primary database node may handle write requests that are received. The standby nodes may replicate the data from the primary node. The number of standby nodes may be increased or decreased to manage operating costs.

Implementations of the disclose subject matter may determine whether to send a request to the primary node or the standby nodes. The request statement may be analyzed. Depending on whether previous transactions have been committed and propagated to the standby node, a current request may either be sent to the standby node (when data from earlier operations have been committed and have propagated to the standby node), or are sent to the primary node (when data has not been propagated to the standby node). That is, implementations of the disclosed subject matter may determine whether a request can be safely sent to standby node for read-only operation.

Implementations of the of disclosed subject matter may determine whether a request may be diverted to a standby node. One or more specific requests may be enabled to be diverted to the standby node. It may be determined whether a particular tenant related to the request is known, and whether the tenant is enabled to handle requests diverted to the standby node. It may be determined whether the tenant is known for a particular request to be diverted to the standby node.

Connections between a server and/or other device and the database system may be managed so that requests may select a connection from a connection pool for a duration of execution of a request. This management may minimize the number of connections, which may be costly, and where too many connections may cause a failure of the database system.

Implementations of the disclosed subject matter may distribute read requests across available standby nodes to achieve load balancing.

With current database systems, virtual machines of database instances could be statically provisioned to handle increased read-only operations to a database. Increasing the number of virtual machine resources in this manner is expensive, and the costs may vary depending how long the virtual machine is run, and how much it is used. As described throughout, implementations of the disclosed subject matter provide scaling of a database system to handle the number of requests by adding read-only standby nodes.

Implementations of the disclosed subject matter improve the function of a computing system by safely directing read-only requests to standby nodes of the database in order to handle increased traffic to the database system. The standby nodes may be dynamically adjusted to handle the changes in the number of read requests to the database system. In this arrangement, the database system may remain operational during high demand periods without crashing or delay to users.

Figure 1:
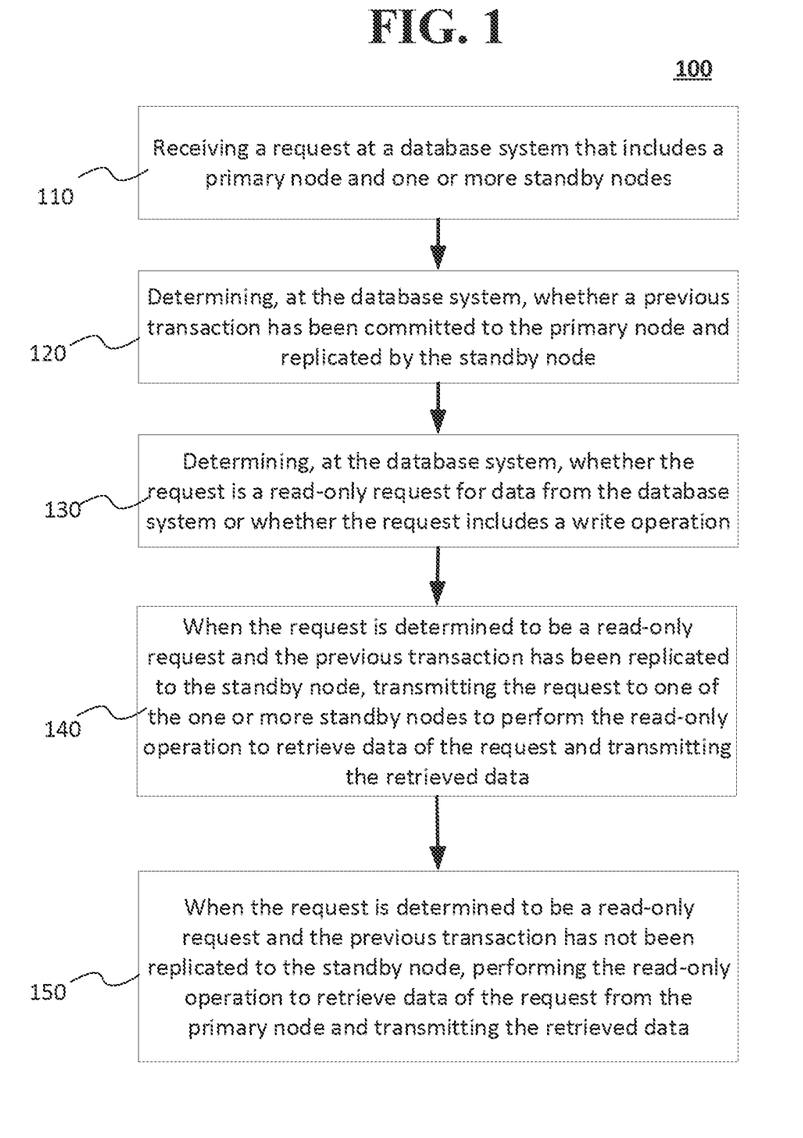
FIG. 1 shows an example method of scaling nodes of a database system to handle requests according to an implementation of the disclosed subject matter.

FIG. 1 shows an example method 100 of scaling nodes of a database system to handle requests according to an implementation of the disclosed subject matter. At operation 110, a database system (e.g., database 900 shown in FIG. 4) that includes a primary node (e.g., primary node 902 shown in FIG. 4) and one or more standby nodes (e.g., standby nodes 904, 906, and/or 908 that may be read-only replicas of the primary node 902) may receive a request.

The standby nodes may be dynamically added or removed based on the number of requests received by the database system. Standby nodes may replicate data from the primary node. There may be latency in replication of the data from the primary node to the standby nodes. Decisions of the database system on diverting received requests to the primary node or to a standby node may be based on the present request, and the state of replication of data between the primary node and the one or more secondary nodes.

When a request of the database system (e.g., structured query language (SQL) statement or the like) is executed, the request may be analyzed. Based at least in part on how the previous requests have been executed, the current request may be transmitted to the primary node or to the standby node. If the operation of the request includes a read-write operation, the request may be handled by the primary node. Read-only requests may be handled by one of the standby nodes. The decision to use standby node may be based at least in part on the state of the standby node. For example, if a portion of the data of the primary node has not been replicated to the standby node, the request may be transmitted to the primary database node, even if the operation of the request is a read-only operation. Read requests may be distributed across available standby nodes to achieve balance.

Figure 4:
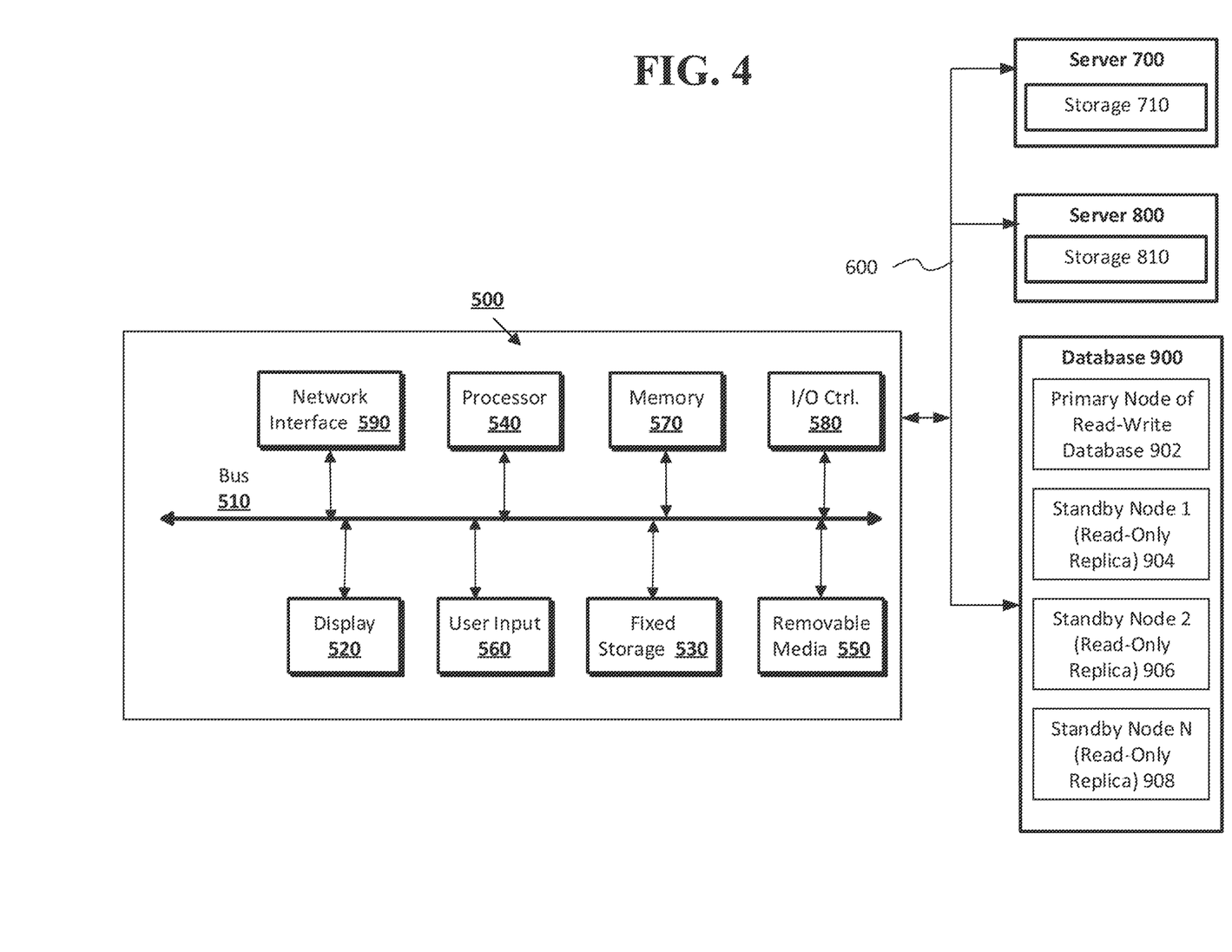
FIG. 4 shows hardware components that may implement the example methods of FIGS. 1-3 according to an implementation of the disclosed subject matter.

At operation 120, the database system may determine whether a previous transaction has been committed to the primary node (e.g., primary node 902 shown in FIG. 4) and replicated by the standby node (e.g., standby nodes 904, 906, and/or 908 shown in FIG. 4). That is, operation 120 may determine whether prior requests, which may be related to the present request, have been committed to the primary node and/or replicated by one or more of the standby nodes. The state of the primary and/or standby nodes may be used by the database system to determine whether to divert the request received at operation 110 to one of the standby nodes.

At operation 130, the database system may determine whether the request is a read-only request for data from the database system or whether the request includes a write operation. When the request is determined to be a read-only request and the previous transaction has been replicated to the standby node (e.g., as determined by the database system in operation 120), the request may be transmitted to one of the one or more standby nodes (e.g., standby nodes 904, 906, and/or 908 shown in FIG. 4) to perform the read-only operation to retrieve data of the request at operation 140. This operation may include transmitting the retrieved data. When the request is determined to be a read-only request and the previous transaction has not been replicated to the standby node, the read-only operation may be performed to retrieve data of the request from the primary node (e.g., primary node 902 shown in FIG. 4) at operation 150. This operation may include transmitting the retrieved data.

That is, operations 140 and 150 may be performed by the database system to determine whether to divert the request to a standby node based on whether pervious transaction data has been replicated to the standby node from the primary node. In some implementations of method 100, when the request is determined by the database system to include a write operation, the write operation may be performed at the primary node of the database system.

FIGS. 2A-2G show optional operations of the example method 100 shown in FIG. 1 according to implementations of the disclosed subject matter. At operation 160 shown in FIG. 2A, the database system (e.g., database 900 shown in FIG. 4) may determine whether diversion of the request to one of the one or more standby nodes (e.g., standby nodes 904, 906, and/or 908 shown in FIG. 4) is enabled by default. That is, in some implementations, requests may be directed to one of the standby nodes by default if other conditions are met, as discussed below.

Figure 2A:
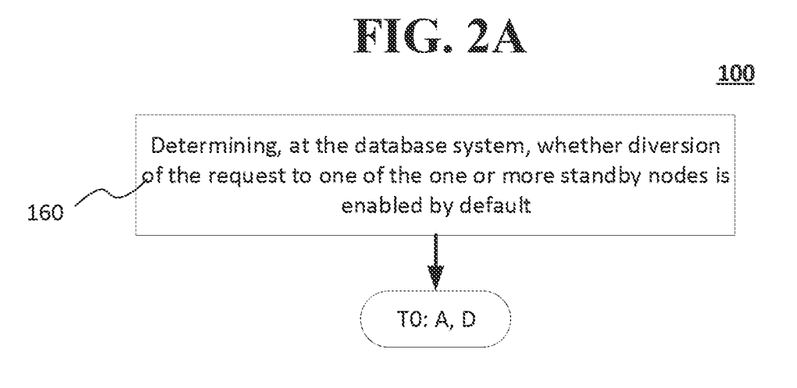
Figure 2B:
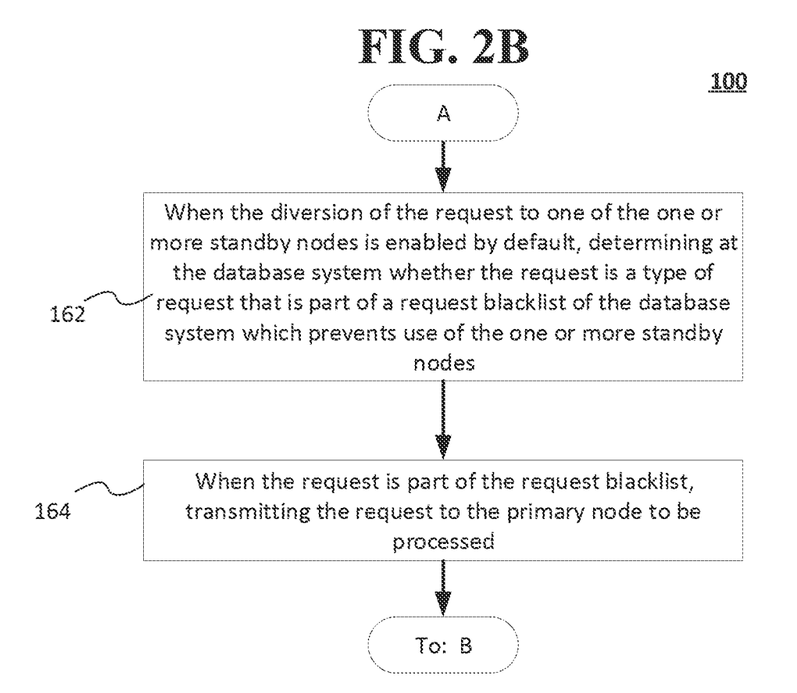

As shown in FIG. 2B, the database system may determine whether the request is a type of request that is part of a request blacklist of the database system. The blacklist may prevent the use of the one or more standby nodes (e.g., standby nodes 904, 906, and/or 908 shown in FIG. 4) when the diversion of the request to one of the one or more standby nodes is enabled by default at operation 162. That is, if it is determined that a request type is on the blacklist, the request is not directed to one of the standby nodes, and may be handled by the primary node instead. The database system may transmit the request to the primary node (e.g., primary node 902 shown in FIG. 4) to be processed when the request is part of the request blacklist at operation 164.

Figure 2C:
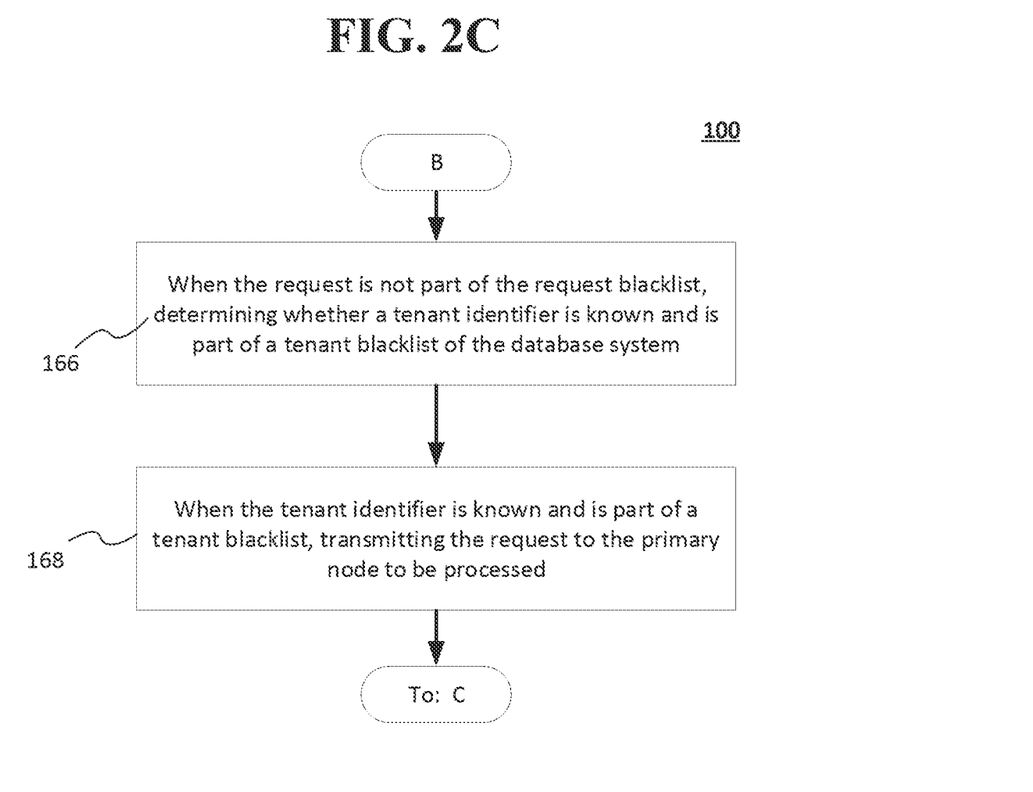

As shown in FIG. 2C, the database system may determine whether a tenant identifier is known and is part of a tenant blacklist of the database system at operation 166. That is, the database system may determine whether a tenant for which the request is directed is on a tenant blacklist which may prohibit the direction of the request to one of the standby nodes. The database system may transmit the request to the primary node to be processed when the tenant identifier is known and is part of a tenant blacklist at operation 168. If the tenant is not on the blacklist, the request may be eligible to be directed to one of the standby nodes, if other conditions are met, as discussed below.

Figure 2D:
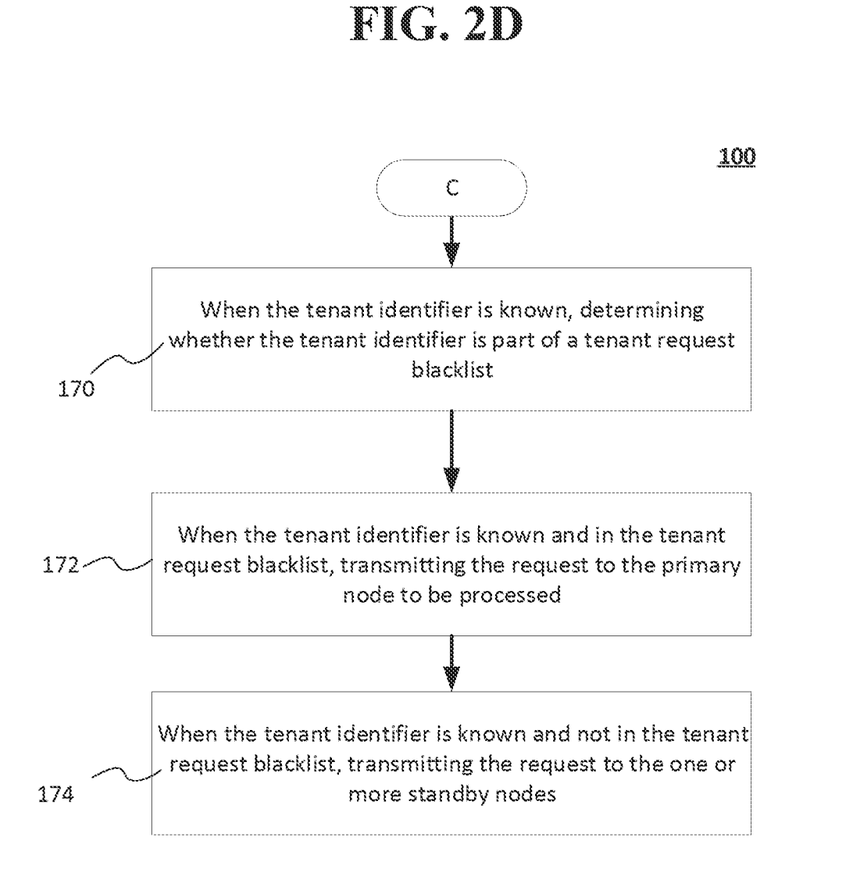

As shown in FIG. 2D, when the tenant identifier is known, the database system may determine whether the tenant identifier is part of a tenant request blacklist at operation 170. That is, a type of request for a particular tenant may be on a blacklist that may prevent the use of the standby node. When the tenant identifier is known and the request is in the tenant request blacklist, the database system may transmit the request to the primary node to be processed at operation 172. When the tenant identifier is known and the request is not in the tenant request blacklist, the database system may transmit the request to the one or more standby nodes to be processed at operation 174. That is, the database system may determine that the request may be safely handled by one of the standby nodes.

Figure 2E:
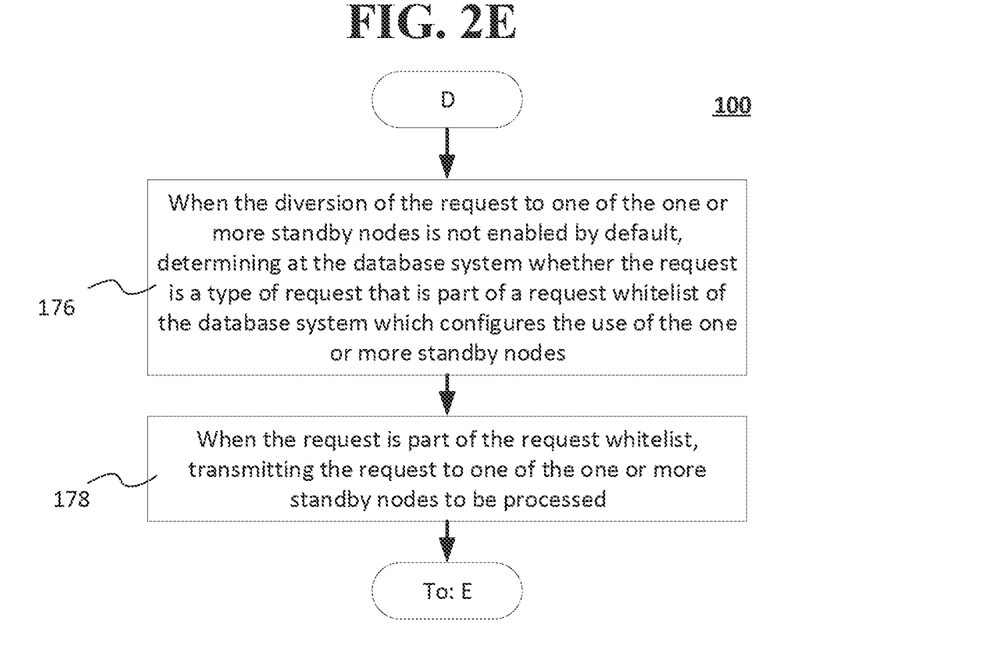

As shown in FIG. 2E, when the diversion of the request to one of the one or more standby nodes is not enabled by default (e.g., as determined by operation 160 shown in FIG. 2A, the database system may determining whether the request is a type of request that is part of a request whitelist of the database system which configures the use of the one or more standby nodes at operation 176. When the request is part of the request whitelist, the database system may transmit the request to one of the one or more standby nodes to be processed at operion 178.

Figure 2F:
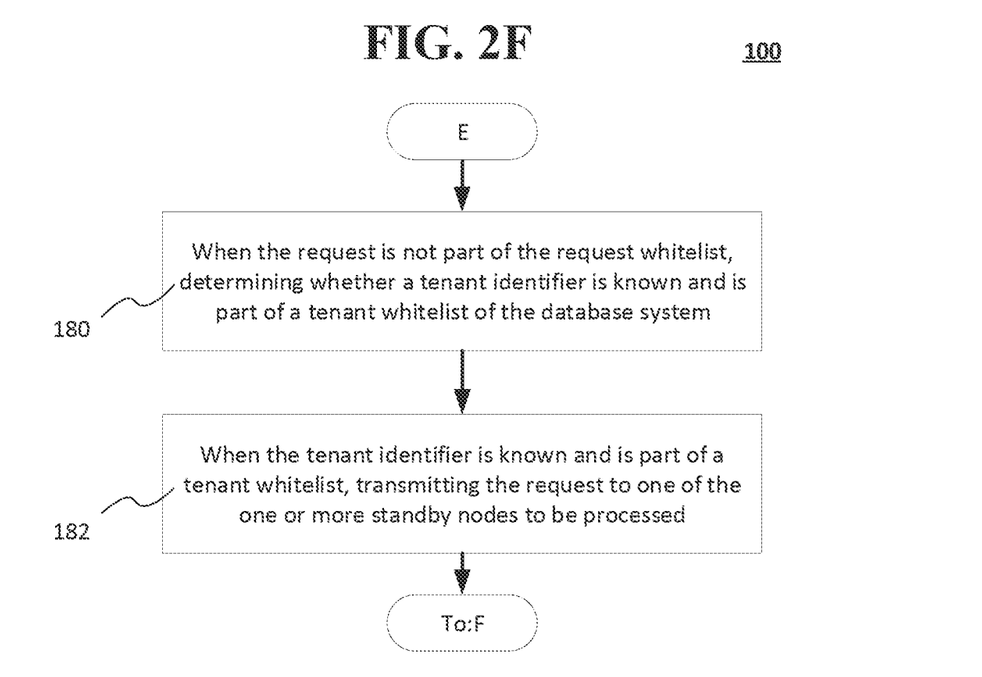

As shown in FIG. 2F, when the request is not part of the request whitelist, the database system may determine whether a tenant identifier is known and is part of a tenant whitelist of the database system at operation 180. When the tenant identifier is known and is part of a tenant whitelist, the database system may transmit the request to one of the one or more standby nodes to be processed at operation 182.

Figure 2G:
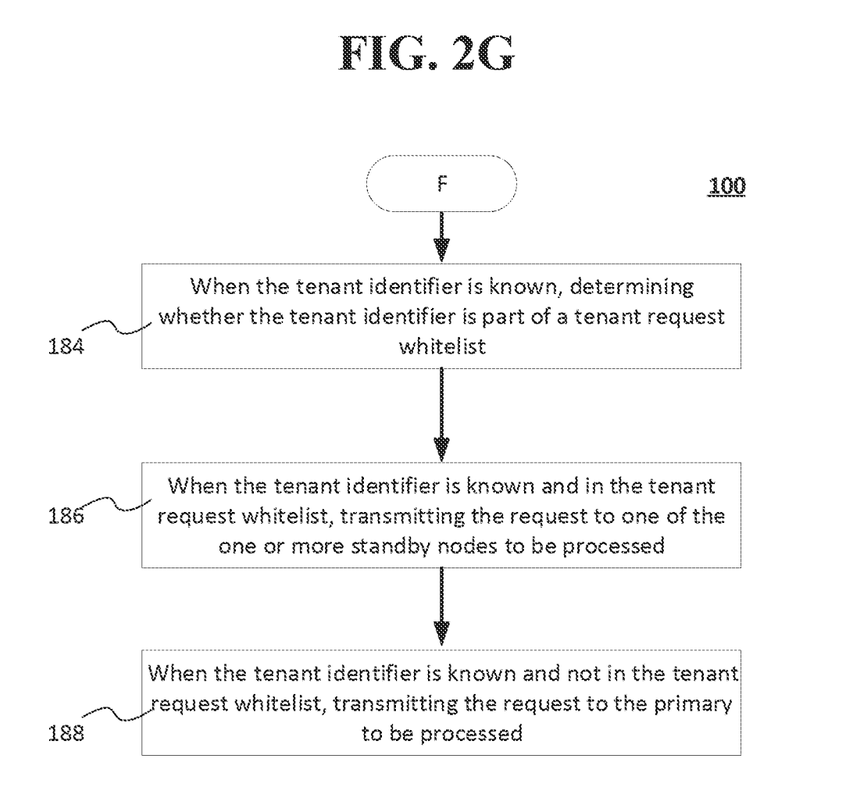

As shown in FIG. 2G, when the tenant identifier is known, the database may determine whether the tenant identifier is part of a tenant request whitelist at operation 184. When the tenant identifier is known and in the tenant request whitelist, the database may transmit the request to one of the one or more standby nodes to be processed at operation 186. When the tenant identifier is known and not in the tenant request whitelist, the database system may transmit the request to the primary node to be processed at operation 188.

Figure 3:
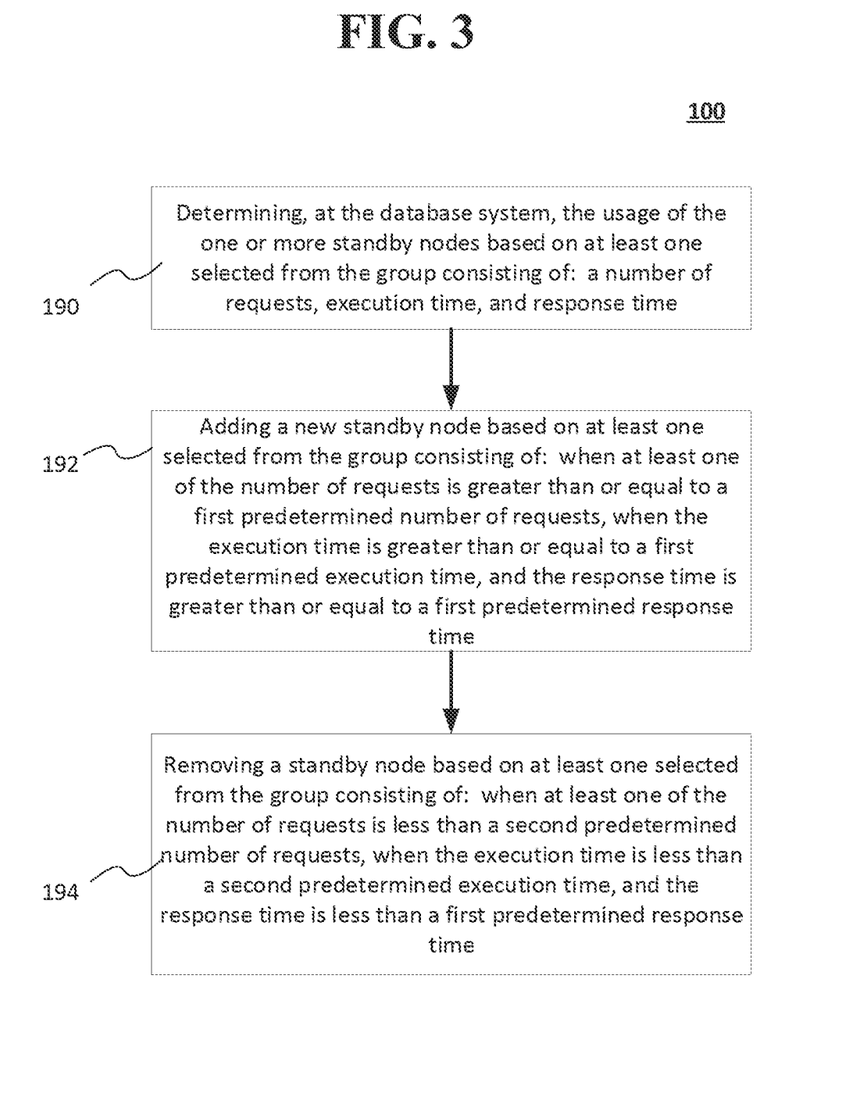

FIG. 3 shows optional operations of the example method 100 shown in FIG. 1 according to an implementation of the disclosed subject matter. At operation 190, the database system may determine the usage based on a number of requests (e.g., the number of requests being handled by each of the standby nodes), an execution time (e.g., how long each request is taking to be processed by the standby node), and/or a response time (e.g., how long each standby node is taking to respond to a request). This operation may be performed to distribute read-only requests to balance the requests amongst the standby nodes, and to determine whether to add or remove one or more of the standby nodes. At operation 192, the database system may add a new standby node based on when at least one of the number of requests is greater than or equal to a first predetermined number of requests, when the execution time is greater than or equal to a first predetermined execution time, and/or the response time is greater than or equal to a first predetermined response time. At operation 194, the database system may remove a standby node based on when at least one of the number of requests is less than a second predetermined number of requests, when the execution time is less than a second predetermined execution time, and/or the response time is less than a first predetermined response time.

The example operations of method 100 shown in FIGS. 1-3 may provide a rules-based request diversion to safely handle read-only requests to the database system. That is, the operations of method 100 may be used to divert requests to standby nodes of the database system for read-only operations. A particular feature request URI (uniform resource identifier), for a particular tenant, and/or for a specific user may directed be to a standby node of the database system to handle read-only requests.

For example, a filter named SystematicDiversionFilter may divert requests to standby nodes of the database system based on one or more configuration rules (e.g., one or more of the operations detailed in FIGS. 1-3). When a request received by the database system attempts to establish a connection to the database system and/or executes a query (e.g., a SQL query), a database connection proxy class (e.g., TrafficDivertingDatabaseConnectionProxy) may perform one or more checks (e.g., the operations shown in FIGS. 2A-3 and described above), and may provide a read-only connection (e.g., to a standby node) if all conditions are met. If one or more of the conditions are not met, a read-write connection to the primary node of the database system may be established. Meeting the conditions may safely provide a way to divert requests to the database system to standby nodes to handle read-only requests to manage the load of the database system when requests increase. Implementations of the disclosed subject matter may be used to select a database node (e.g., primary node 902, or standby node 904, 906, or 908 shown in FIG. 4) when the database system verifies that the conditions of the database node (i.e., the operational state of the database node) may perform to provide results for a request based on a predetermine range of a number of requests that the node is handling, a predetermined range of execution times, and/or a predetermined range of response times. That is, a node may be selected so that the database system may provide results (e.g., to an application) within a predetermined performance range.

The status of the database system may be determined during an application startup (e.g., an application that may be a commerce application, a web-based storefront, or the like that may be communicatively coupled to the database system) and/or connection pool initialization. The connection pool initialization may include a discovery of the topology of the database system, such as the primary node and/or the number of standby nodes, and/or the capacity of one or more of the nodes. For example, when establish a connection with the database system to process a request, if a useTrafficDivertingConnections is enabled, a TrafficDivertingConnectionPool is initialized, and may return an instance of TrafficDivertingDatabaseConnectionProxy. When a connection is created, it may be placed within a connection pool of the database system, where a request may use a connection from the connection pool when it is needed for the duration of execution of the request. In some implementations, a connection pool management layer of the database system may manage the connection pool. For example, the connection pool management layer may monitor the number of connections, and may reduce the number of connections when one or more connections have not been utilized within a predetermined period of time. The connection pool management layer may manage the number of connections in the connection pool to prevent failure and/or instability of the database system from having a connection amount that exceeds a predetermined number of connections.

An example configuration for a database system to handle requests and safely divert at least some requests to one or more standby nodes is shown in Table 1 below. That is, the configuration in Table 1, along with the example operations shown in FIGS. 1-3 may be used in providing a rules-based request diversion.

TABLE 1

| Name | Type | Description |
| --- | --- | --- |
| IsDiversionEnabledByDefault | Boolean | Determines whether diversion to the one or more standby nodes is enabled |
| OrgWhitelist | List<String> | List of tenants (Orgs) for which the diversion feature is enabled |
| OrgBlacklist | List<String> | List of tenants (Orgs) for which the diversion feature is disabled and/or blocked. This may disable the diversion feature for selected tenant when the diversion feature is generally available for other tenants. |
| EndpointWhitelist | List<String> | List of endpoint URIs for which the diversion feature of is disabled. This may disable the diversion feature for selected endpoints when the diversion feature is generally available for other endpoints |
| EndpointBlacklist | List<String> | List of endpoint URIs for which the diversion feature is disabled. This is to disable the diversion feature for selected endpoints when the feature is generally available for other endpoints. |
| OrgEndpointWhitelist | List<String> | List of <Tenant ID + endpoint URI> |
| OrgEndpointBlacklist | List<String> | List of <Tenant ID + endpoint URI |

Implementations of the disclosed subject matter may provide a way to determine what node to send a request. The request may be analyzed to determine the operation to be performed, the tenant involved with the request, and the like. Implementations of the disclosed subject matter may check for any dependencies of the present request. For example, a selection in an application that is executed by a server (e.g., server 700 and/or 800 shown in FIG. 4) that is communicatively connected to the database system may generate one or more requests when a selection is received at the application (e.g., from a user at user input 560 of computer 500 communicatively connected to the server 700, 800). That is, there may be a plurality of requests to the database system to render a page of the application (e.g., a commerce application, a web-based storefront application, or the like). Implementations of the disclosed subject matter may provide diversion of requests to a read-only standby node based on the operation state of the database nodes (e.g., the number of requests being handled by a node, the execution time of each node, and/or the response time of each node, or the like). That is, implementations of the disclosed subject matter may provide diversion of requests without using class modifiers in an application, such as a Read-Only Clone for Scale (ROCS) modifier, which may be a feature where requests of the class may be sent to a standby node of a database system. Implementations of the disclosed subject matter may be used to safely direct requests to the standby node, which may handle read-only requests when the database system is experiencing an increased volume of requests. Implementations of the disclosed subject matter may also be used for load balancing, where read-only requests may be balanced across the available standby nodes.

Implementations of the presently disclosed subject matter may be implemented in and used with a variety of component and network architectures. FIG. 4 is an example computer 500 which may display a user interface for an application that may be generated by server 700, 800, where the application may transmit requests to the database system 900. The database system 900 may process the request based on at least some of the operations shown in FIGS. 1-3 and described above.

As shown in FIG. 4, the computer 500 may communicate with a server 700 (e.g., a server, cloud server, database, cluster, application server, neural network system, or the like) via a wired and/or wireless communications network 600. The server 700 may be a plurality of servers, cloud servers, databases, clusters, application servers, neural network systems, or the like. The server 700 may include a processor 705, which may be a hardware processor, a microprocessor, an integrated circuit, a field programmable gate array, or the like. The server 700 may include a storage device 710. The storage 710 may use any suitable combination of any suitable volatile and non-volatile physical storage mediums, including, for example, hard disk drives, solid state drives, optical media, flash memory, tape drives, registers, and random access memory, or the like, or any combination thereof. The server 700 may be communicatively coupled to database 900, which may use any suitable combination of any suitable volatile and non-volatile physical storage mediums, including, for example, hard disk drives, solid state drives, optical media, flash memory, tape drives, registers, and random access memory, or the like, or any combination thereof. The server 700 may be communicatively coupled to server 800, which may be one or more servers, cloud servers, databases, clusters, application servers, neural network systems, or the like. The server 800 may include a processor 805, which may be a hardware processor, a microprocessor, an integrated circuit, a field programmable gate array, or the like Server 800 may include storage 810, which may use any suitable combination of any suitable volatile and non-volatile physical storage mediums, including, for example, hard disk drives, solid state drives, optical media, flash memory, tape drives, registers, and random access memory, or the like, or any combination thereof. The server 700 and/or server 800 may execute one or more application instances. The server 700 and/or 800 may use data from the database 900 in providing a storefront and/or website to an end user of the computer 500.

The storage 710 of the server 700, the storage 810 of the server 800, and/or the database 900, may store data for one or more instances of the application, updates for the application, and the like. Further, if the storage 710, storage 910, and/or database 800 is a multitenant system, the storage 710, storage 910, and/or database 800 can be organized into separate log structured merge trees for each instance of a database for a tenant. Alternatively, contents of all records on a particular server or system can be stored within a single log structured merge tree, in which case unique tenant identifiers associated with versions of records can be used to distinguish between data for each tenant as disclosed herein. More recent transactions can be stored at the highest or top level of the tree and older transactions can be stored at lower levels of the tree. Alternatively, the most recent transaction or version for each record (i.e., contents of each record) can be stored at the highest level of the tree and prior versions or prior transactions at lower levels of the tree.

The computer (e.g., user computer, enterprise computer, or the like) 500 may include a bus 510 which interconnects major components of the computer 500, such as a central processor 540, a memory 570 (typically RAM, but which can also include ROM, flash RAM, or the like), an input/output controller 580, a user display 520, such as a display or touch screen via a display adapter, a user input interface 560, which may include one or more controllers and associated user input or devices such as a keyboard, mouse, Wi-Fi/cellular radios, touchscreen, microphone/speakers and the like, and may be communicatively coupled to the I/O controller 580, fixed storage 530, such as a hard drive, flash storage, Fibre Channel network, SAN device, SCSI device, and the like, and a removable media component 550 operative to control and receive an optical disk, flash drive, and the like.

The bus 510 may enable data communication between the central processor 540 and the memory 570, which may include read-only memory (ROM) or flash memory (neither shown), and random access memory (RAM) (not shown), as previously noted. The RAM may include the main memory into which the operating system, development software, testing programs, and application programs are loaded. The ROM or flash memory can contain, among other code, the Basic Input-Output system (BIOS) which controls basic hardware operation such as the interaction with peripheral components. Applications resident with the computer 500 may be stored on and accessed via a computer readable medium, such as a hard disk drive (e.g., fixed storage 530), an optical drive, floppy disk, or other storage medium 550.

The fixed storage 530 can be integral with the computer 500 or can be separate and accessed through other interfaces. The fixed storage 530 may be part of a storage area network (SAN). A network interface 590 can provide a direct connection to a remote server via a telephone link, to the Internet via an internet service provider (ISP), or a direct connection to a remote server via a direct network link to the Internet via a POP (point of presence) or other technique. The network interface 590 can provide such connection using wireless techniques, including digital cellular telephone connection, Cellular Digital Packet Data (CDPD) connection, digital satellite data connection or the like. For example, the network interface 590 may enable the computer to communicate with other computers and/or storage devices via one or more local, wide-area, or other networks, such as communications network 600.

Many other devices or components (not shown) may be connected in a similar manner (e.g., data cache systems, application servers, communication network switches, firewall devices, authentication and/or authorization servers, computer and/or network security systems, and the like). Conversely, all the components shown in FIG. 4 need not be present to practice the present disclosure. The components can be interconnected in different ways from that shown. Code to implement the present disclosure can be stored in computer-readable storage media such as one or more of the memory 570, fixed storage 530, removable media 550, or on a remote storage location.

Some portions of the detailed description are presented in terms of diagrams or algorithms and symbolic representations of operations on data bits within a computer memory. These diagrams and algorithmic descriptions and representations are commonly used by those skilled in the data processing arts to most effectively convey the substance of their work to others skilled in the art. An algorithm is here and generally conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "determining," "transmitting," "performing," "adding," "removing," "distributing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

More generally, various implementations of the presently disclosed subject matter can include or be implemented in the form of computer-implemented processes and apparatuses for practicing those processes. Implementations also can be implemented in the form of a computer program product having computer program code containing instructions implemented in non-transitory and/or tangible media, such as hard drives, solid state drives, USB (universal serial bus) drives, CD-ROMs, or any other machine readable storage medium, wherein, when the computer program code is loaded into and executed by a computer, the computer becomes an apparatus for practicing implementations of the disclosed subject matter. Implementations also can be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium can be implemented by a general-purpose processor, which can transform the general-purpose processor or a device containing the general-purpose processor into a special-purpose device configured to implement or carry out the instructions. Implementations can be implemented using hardware that can include a processor, such as a general purpose microprocessor and/or an Application Specific Integrated Circuit (ASIC) that implements all or part of the techniques according to implementations of the disclosed subject matter in hardware and/or firmware. The processor can be coupled to memory, such as RAM, ROM, flash memory, a hard disk or any other device capable of storing electronic information. The memory can store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described to explain the principles of implementations of the disclosed subject matter and their practical applications, to thereby enable others skilled in the art to utilize those implementations as well as various implementations with various modifications as can be suited to the particular use contemplated.

The invention claimed is:

1. A method comprising:
receiving a request at a database system having one or more physical storage devices, wherein the database system includes a primary node and a plurality of standby nodes that are read-only;
determining, at the database system, whether a previous transaction of a previously received request that is related to the received request has been committed to the primary node, and determining whether the previous transaction has been replicated by committing the previous transaction to at least some of the plurality of standby nodes by storing the previous transaction in the one or more physical storage devices of the database system;
determining, at the database system, whether the request is a read-only request for data stored in the one or more physical storage devices of the database system and whether diversion of the request to one of the plurality of standby nodes is enabled by default, or whether the request includes a write operation;
when the request is determined to be a read-only request and the previous transaction has been replicated, distributing the request determined to be a read-only request among the standby nodes that have replicated the previous transaction to load balance each of the plurality of standby nodes and transmitting the retrieved data from a standby node to which the request was distributed;
when the request is determined to be a read-only request and the previous transaction has not been replicated, performing the read-only operation to retrieve data of the request from the primary node and transmitting the retrieved data; and
when the request is determined to be a read-only request and diversion of the request to one of the plurality of standby nodes is enabled by default, determining at the database system whether the request is a type of request that is part of a request blacklist of the database system which prevents use of at least one of the plurality of standby nodes transmitting the request to the primary node to be processed, and transmitting the request to the primary node to be processed when the request is part of the request blacklist.

2. The method of claim 1, further comprising:
when the request is determined to include a write operation, performing the write operation at the primary node of the database system.

3. The method of claim 1, further comprising:
when the request is not part of the request blacklist, determining whether a tenant identifier is known and is part of a tenant blacklist of the database system;
when the tenant identifier is known and is part of a tenant blacklist, transmitting the request to the primary node to be processed.

4. The method of claim 3, further comprising:
when the tenant identifier is known, determining whether the tenant identifier is part of a tenant request blacklist;
when the tenant identifier is known and in the tenant request blacklist, transmitting the request to the primary node to be processed; and
when the tenant identifier is known and is not in the tenant request blacklist, transmitting the request to one of the plurality of standby nodes to be processed.

5. The method of claim 1, further comprising:
when the diversion of the request to one of the plurality of standby nodes is not enabled by default, determining at the database system whether the request is a type of request that is part of a request whitelist of the database system which configures the use of the plurality of standby nodes; and
when the request is part of the request whitelist, transmitting the request to one of the plurality of standby nodes to be processed.

6. The method of claim 5, further comprising:
when the request is not part of the request whitelist, determining whether a tenant identifier is known and is part of a tenant whitelist of the database system; and
when the tenant identifier is known and is part of a tenant whitelist, transmitting the request to one of the plurality of standby nodes to be processed.

7. The method of claim 6, further comprising:
when the tenant identifier is known, determining whether the tenant identifier is part of a tenant request whitelist;
when the tenant identifier is known and in the tenant request whitelist, transmitting the request to one of the plurality of standby nodes to be processed; and
when the tenant identifier is known and not in the tenant request whitelist, transmitting the request to the primary node to be processed.

8. The method of claim 1, further comprising:
adding the new standby node based on at least one selected from the group consisting of: when at least one of the number of requests is greater than or equal to a first predetermined number of requests, when the execution time is greater than or equal to a first predetermined execution time, and the response time is greater than or equal to a first predetermined response time; and
removing the standby node of the one or more standby nodes based on at least one selected from the group consisting of: when at least one of the number of requests is less than a second predetermined number of requests, when the execution time is less than a second predetermined execution time, and the response time is less than a first predetermined response time.

9. A system comprising:
a database system comprising one or more physical storage devices, wherein the database system includes a primary node and a plurality of standby nodes that are read-only, and wherein the database system:
receives a request;
determines whether a previous transaction of a previously received request that is related to the received request has been committed to the primary node, and determining whether the previous transaction has been replicated by committing the previous transaction to at least some of the plurality of standby nodes by storing the previous transaction in the one or more physical storage devices of the database system;
determines whether the request is a read-only request for data stored in the one or more physical storage devices of the database system and whether diversion of the request to one of the plurality of standby nodes is enabled by default, or whether the request includes a write operation;
distributes the request determined to be a read-only request among the standby nodes that have replicated the previous transaction to load balance the plurality of standby nodes and transmits the retrieved data from a standby node to which the request was distributed when the request is determined to be a read-only request and the previous transaction has been replicated to the standby node;
performs the read-only operation to retrieve data of the request from the primary node and transmitting the retrieved data when the request is determined to be a read-only request and the previous transaction has not been replicated; and
determines whether the request is a type of request that is part of a request blacklist of the database system which prevents use of at least one of the plurality of standby nodes transmitting the request to the primary node to be processed when the request is determined to be a read-only request and diversion of the request to one of the plurality of standby nodes is enabled by default, and transmits the request to the primary node to be processed when the request is part of the request blacklist.

10. The system of claim 9, wherein the database system performs the write operation at the primary node when the request is determined to include a write operation.

11. The system of claim 9, wherein the database system:
determines whether a tenant identifier is known and is part of a tenant blacklist of the database system when the request is not part of the request blacklist; and
transmits the request to the primary node to be processed when the tenant identifier is known and is part of a tenant blacklist.

12. The system of claim 11, wherein the database system:
determines whether the tenant identifier is part of a tenant request blacklist when the tenant identifier is known;
transmits the request to the primary node to be processed when the tenant identifier is known and in the tenant request blacklist; and
transmits the request to one of the plurality of standby nodes to be processed when the tenant identifier is known and not in the tenant request blacklist.

13. The system of claim 9, wherein the database system:
determines at the database system whether the request is a type of request that is part of a request whitelist of the database system which configures the use of the plurality of standby nodes when the diversion of the request to one of the plurality of standby nodes is not enabled by default; and
transmits the request to one of the plurality of standby nodes to be processed when the request is part of the request whitelist.

14. The system of claim 13, wherein the database system:
determines whether a tenant identifier is known and is part of a tenant whitelist of the database system when the request is not part of the request whitelist; and transmits the request to one of the plurality of standby nodes to be processed when the tenant identifier is known and is part of a tenant whitelist.

15. The system of claim 14, wherein the database system:

determines whether the tenant identifier is part of a tenant request whitelist;

transmits the request to one of the plurality of standby nodes to be processed when the tenant identifier is known and in the tenant request whitelist; and transmits the request to the primary node to be processed when the tenant identifier is known and not in the tenant request whitelist.

16. The system of claim 9, wherein the database system:

adds the new standby node based on at least one selected from the group consisting of: when at least one of the number of requests is greater than or equal to a first predetermined number of requests, when the execution time is greater than or equal to a first predetermined execution time, and the response time is greater than or equal to a first predetermined response time; and removes the standby node of the one or more standby nodes based at least one selected from the group consisting of: when at least one of the number of requests is less than a second predetermined number of requests, when the execution time is less than a second predetermined execution time, and the response time is less than a first predetermined response time.

* * * * *